United States Patent
Woodward

(10) Patent No.: US 8,351,520 B2
(45) Date of Patent: Jan. 8, 2013

(54) DYNAMICALLY SELECTING METHODS TO REDUCE DISTORTION IN MULTI-CARRIER MODULATED SIGNALS RESULTING FROM HIGH PEAK-TO-AVERAGE POWER RATIOS

(75) Inventor: Graeme K. Woodward, Epping (AU)

(73) Assignee: Agere Systems LLC, Allentown, PA (US)

( * ) Notice: Subject to any disclaimer, the term of this patent is extended or adjusted under 35 U.S.C. 154(b) by 851 days.

(21) Appl. No.: 12/377,192

(22) PCT Filed: Sep. 19, 2007

(86) PCT No.: PCT/US2007/078879
§ 371 (c)(1),
(2), (4) Date: Feb. 11, 2009

(87) PCT Pub. No.: WO2008/036730
PCT Pub. Date: Mar. 27, 2008

(65) Prior Publication Data
US 2010/0177847 A1    Jul. 15, 2010

Related U.S. Application Data

(60) Provisional application No. 60/826,158, filed on Sep. 19, 2006, provisional application No. 60/875,270, filed on Dec. 15, 2006.

(51) Int. Cl.
*H04L 27/28* (2006.01)
*H04K 1/10* (2006.01)
(52) U.S. Cl. .................. 375/260; 375/285; 375/296
(58) Field of Classification Search ............. 375/260, 375/295, 285, 296, 309, 312
See application file for complete search history.

(56) References Cited

U.S. PATENT DOCUMENTS
7,432,838 B2    10/2008    Muck et al.
(Continued)

FOREIGN PATENT DOCUMENTS
WO    WO2005025102 A1    3/2005

OTHER PUBLICATIONS

"SOCP Approach for OFDM Peak-to-Average Power Ratio Reduction in the Signal Adding Context," by Zidkieta Zabre, et al; XP-031002542; 2006 IEEE International Symposium on Signal Processing and Information Technology, Jan. 2006, pp. 834-839.

(Continued)

*Primary Examiner* — Ted Wang
(74) *Attorney, Agent, or Firm* — Mendelsohn, Drucker & Associates, P.C.; Craig M. Brown; Steve Mendelsohn

(57) ABSTRACT

In one embodiment, an algorithm dynamically selects a method for reducing distortion in a multi-carrier modulated signal, such as an orthogonal frequency division multiplexing (OFDM) signal. The algorithm directs a transmitter to transmit peak-to-average power ratio (PAPR)-reduction signals over reserved tones (i.e., frequencies) if reserved tones are available. If reserved tones are not available, then the algorithm directs the transmitter to transmit PAPR-reduction symbols over free tones if free tones are available. If the free tones for this transmitter are used by adjacent transmitters, then interference-reduction techniques may be used to reduce interference with the adjacent transmitters. If reserved tones and free tones are not available, then the transmitter may use an alternative method to reduce distortion, such as successive clipping and filtering. In another embodiment, the transmitter may transmit PAPR-reduction symbols over both free and reserved tones, if available.

21 Claims, 5 Drawing Sheets

U.S. PATENT DOCUMENTS

| | | | |
|---|---|---|---|
| 7,643,801 B2 | 1/2010 | Piirainen | |
| 7,839,880 B2 | 11/2010 | Seki | |
| 2005/0238110 A1* | 10/2005 | Yun et al. | 375/260 |
| 2007/0230597 A1 | 10/2007 | Coon | |
| 2007/0280365 A1* | 12/2007 | Seki | 375/260 |

OTHER PUBLICATIONS

"New Techniques for Multicarrier Communication Systems," by Brian Scott Krongold; Thesis, University of Illinois at Urbana-Campaign, 2003, pp. 66-137.

"A Subgradient Algorithm for Low Complexity DMT PAR Minimization," by Alper Erdogan; Acoustics, Speech & Signal Processing, 2004, Proceedings (ICASSP '04) IEEE International Conference, vol. 417-2 (May 2004); pp. IV-1077-IV-1080.

Examination Report; Mailed Dec. 27, 2011 for the corresponding European Application No. 07842768.9.

Tellado, J., et al., "Peak Power Reduction for Multicarrier Transmission," Proc. IEEE Globecom; Conf, 1998.

Wattanasuwakull, T., et al., PAPR Reduction of OFDM Transmission by Using a Method of Tone Reservation and Tone Injection, Information, Communications and Signal Processing, 2005 Fifth International Conference on 2005.

The Institute of Electronics, Information and Communication Engineer, "Digital signal Processing Handbook," OHM Company, pp. 188-190, Jan. 31, 1993.

Examiner's Office Letter; Mailed Jul. 7, 2012 for the corresponding JP Application No. 2009-529361.

* cited by examiner

DYNAMICALLY SELECTING METHODS TO REDUCE DISTORTION IN MULTI-CARRIER MODULATED SIGNALS RESULTING FROM HIGH PEAK-TO-AVERAGE POWER RATIOS

CROSS-REFERENCE TO RELATED APPLICATIONS

This application claims the benefit of the filing dates of U.S. provisional application No. 60/875,270 filed on Dec. 15, 2006, and U.S. provisional application No. 60/826,158 filed on Sep. 19, 2006, the teachings of both of which are incorporated herein by reference.

The subject matter of this application is related to U.S. patent application no. 12/377,178 filed on the same date as this application the teachings of which are incorporated herein by reference.

BACKGROUND OF THE INVENTION

1. Field of the Invention

The present invention relates to signal processing, and more specifically, to multi-carrier modulation techniques, such as orthogonal frequency division multiplexing (OFDM), used in signal transmission and reception.

2. Description of the Related Art

Multi-carrier modulation techniques, such as orthogonal frequency division multiplexing (OFDM), are used in wired and wireless communication systems such as local area networks, fixed, and mobile metropolitan area networks, and cellular phone systems. In general, multi-carrier modulated symbols are generated by dividing a frequency spectrum into smaller frequency subcarriers (a.k.a., tones) and modulating the subcarriers with parts of one or more data signals. The one or more data signals may be acquired from one or more sources (e.g., users), and each multi-carrier modulated symbol may transmit data from more than one source.

FIG. 1 shows a simplified block diagram of one implementation of a prior-art OFDM transmitter 100. Transmitter 100 has data symbol mapper 102, which receives a serial bitstream of digital data from upstream processing. The serial bitstream is divided into groups of bits, and each group is mapped into one or more data symbols to generate a serial stream of data symbols. Mapping may be performed using one or more suitable techniques such as quadrature phase-shift-keying (QPSK) and quadrature amplitude modulation (QAM).

Serial-to-parallel (S/P) converter 104 converts the serial stream of data symbols received from data symbol mapper 102 into D parallel streams of data symbols. Subcarrier mapper 106 assigns the D parallel data symbol streams to N subcarrier frequencies (i.e., tones), where the N subcarrier frequencies are arranged orthogonally to one another. In particular, each parallel data symbol stream is assigned to a separate output of subcarrier mapper 106, where each output corresponds to a different one of the N subcarriers. Note that, for ease of discussion, this implementation assumes that the number D of data symbol streams is equal to the number N of subcarriers. According to other implementations, a number D of data symbols and a number P of pilot symbols may be assigned to the N subcarriers, where there may be a number U of unused (i.e., free) subcarriers, such that N=D+P+U. The N outputs (e.g., $Z=Z_1, \ldots, Z_N$) of subcarrier mapper 106 are then provided to inverse fast Fourier transform (IFFT) processor 108. IFFT processor 108 transforms each set of N outputs from subcarrier mapper 106, where each output in a set corresponds to a different one of the D data symbols, into one OFDM symbol, comprising N time-domain complex numbers (e.g., $z=z_1, \ldots, z_N$).

Each OFDM symbol is then prepared for transmission. First, a cyclic prefix, comprising C complex numbers, is inserted onto each OFDM symbol by cyclic-prefix inserter (CPI) 110. This prefix enables the receiver to cope with signal echoes that result from multi-path reflections. Next, each set of N time-domain complex numbers and each corresponding set of C cyclic prefix complex numbers are converted from parallel to serial format by parallel-to-serial (P/S) converter 112. The output of P/S converter 112 may be further processed using digital-to-analog conversion, radio-frequency modulation, amplification, or other processing suitable for preparing the OFDM symbols for transmission.

During IFFT processing, the data symbols are applied to modulate the corresponding subcarriers, and the modulated subcarriers are added together, often constructively, creating an OFDM symbol with a number of high and low amplitude peaks. Due to the varying nature of the transmitted data, the height of these peaks will typically vary within each OFDM symbol and from one OFDM symbol to the next. Further, some of these peaks can become relatively large compared to the average amplitude level of the OFDM symbol, resulting in a relatively large peak-to-average power ratio (PAPR). The PAPR for an OFDM symbol may be represented as shown in Equation (1) below:

$$PAPR = \frac{\max_{n=1}^{N}(|z_n|^2)}{\frac{1}{N}\sum_{n=1}^{N}|z_n|^2} \quad (1)$$

In Equation (1), $z_n$ is the $n^{th}$ sample of the OFDM symbol z, and the max function in the numerator determines the largest value of $|z_n|^2$ for $n=1, \ldots, N$.

An OFDM symbol having a relatively large PAPR may become distorted during power amplification. One or more relatively large samples of the OFDM symbol may attempt to drive the output of the amplifier towards its maximum output level. Prior to reaching the maximum output level, the input-to-output relationship of the amplifier may become non-linear resulting in non-linear distortion of the OFDM symbol. When the amplifier's maximum output level is reached, the amplifier clips the sample, resulting in further non-linear distortion of the output signal. Non-linear distortion affects the quality of the signal, and consequently, the receiver may experience difficulties in recovering the transmitted data.

A number of different methods have been employed to reduce the effects of non-linear distortion by the amplifier or eliminate non-linear distortion altogether. In one such method, the transmitter employs a larger amplifier capable of outputting higher power levels. Typically, the larger amplifier is operated with considerable back-off (i.e., the amplifier can be operated at a lower average power) to ensure that the amplifier remains in its linear region of operation even during peak signal events. However, using a larger amplifier in such a manner is inefficient.

In another such method, the transmitter performs amplification in stages to achieve the desired output level. In this method, each stage comprises an amplification step and a filtering step. The amplification step results in relatively minor clipping of the larger samples of each OFDM symbol. The filtering step smoothes out each OFDM symbol to reduce the amount of distortion that occurred in the preceding amplification step. This successive clipping and filtering process is repeated until the desired amplification level is achieved. By amplifying a signal in this manner, the amount of distortion can be reduced over that of an equivalent single-stage amplifier.

In yet another such method, numerous pseudo-random scrambling sequences are applied to the OFDM signal in the frequency-domain (e.g., the output subcarrier mapper 106), and the scrambling sequence that results in the lowest PAPR after IFFT processing is selected. Since the scrambling sequence selected is not known by the receiver, the scrambling sequence may be transmitted to the receiver on another channel, or the sequence may be detected 'blindly' by the receiver. In the later case, the receiver tests all possible sequences and picks the most likely sequence.

Yet further methods, known as tone reservation (TR) methods, attempt to reduce the PAPR for each OFDM symbol. In such methods, a number of frequency subcarriers (i.e., tones) are reserved for transmitting non-data symbols that have the express purpose of reducing PAPRs of OFDM symbols.

FIG. 2 shows a simplified block diagram of one embodiment of a prior-art transmitter 200 which uses a TR approach for reducing PAPR. Transmitter 200 has data symbol mapper 202 and S/P converter 204, which perform operations analogous to those of the equivalent elements of transmitter 100 to generate sets of D parallel data symbols. Subcarrier mapper 206 assigns each set of D data symbols to a set of N subcarriers such that M subcarriers are not assigned a data symbol. The M subcarriers are reserved a priori for transmitting PAPR-reduction symbols. Note that, in certain embodiments, each set of N subcarriers may be assigned D data symbols and P pilot symbols, where there are a number M of reserved subcarriers and a number U of unused (i.e., free) subcarriers, such that N=D+M+U+P. Each set of N outputs (e.g., $Z=Z_1, \ldots, Z_N$) from subcarrier mapper 206 is provided to IFFT processor 208, which performs operations analogous to those of IFFT processor 108 to transform each set into an OFDM symbol z, comprising N time-domain complex numbers (e.g., $z=z_1, \ldots, z_N$).

PAPR-reduction symbol generator 210 receives each OFDM symbol z and compares the PAPR of each symbol to a specified PAPR threshold value, which represents an acceptable level of PAPR reduction for the OFDM symbol. If the PAPR of an OFDM symbol z is less than the PAPR threshold value, then the OFDM symbol z is output from PAPR-reduction symbol generator 210 as OFDM symbol $\hat{z}$ (i.e., $z=\hat{z}$). If the PAPR of an OFDM symbol exceeds the PAPR threshold value, then PAPR-reduction symbol generator 210 generates a set of M PAPR-reduction symbols using any one of a number of approaches (as discussed in further detail below) and provides the set to subcarrier mapper 206. Note that, in other implementations, PAPR-reduction symbol generator 210 may always generate a set of M PAPR-reduction symbols for each OFDM symbol. In such implementations, the comparison between the PAPR of an OFDM symbol z and a specified PAPR threshold value may be omitted.

Subcarrier mapper 206 assigns the set of M PAPR-reduction symbols to the M PAPR-reduction subcarriers and outputs N complex numbers (e.g., $Z=Z_1, \ldots, Z_N$), which includes the M PAPR-reduction symbols and the D data symbols. The N complex numbers are then transformed by IFFY processor 208 to generate a PAPR-reduced version of OFDM symbol z, which is provided to PAPR-reduction symbol generator 210. This process is repeated until the PAPR of the PAPR-reduced OFDM symbol z is less than the PAPR threshold value, and, once this condition occurs, the PAPR-reduced OFDM symbol z is output from PAPR-reduction symbol generator 210 as OFDM symbol $\hat{z}$ (i.e., $z=\hat{z}$). Each OFDM symbol $\hat{z}$ is then prepared for transmission using cyclic-prefix inserter 212 and P/S converter 214, which perform operations analogous to those of the equivalent elements of transmitter 100, and any other processing suitable for preparing OFDM symbols for transmission.

By assigning PAPR-reduction symbols to reserved tones, the peak values of time-domain OFDM symbols may be reduced without affecting the individual data symbols. The designer of an OFDM transmitter has a large degree of freedom to select PAPR-reduction symbols to assign to reserved tones, and numerous methods have been employed for selecting symbols that will sufficiently reduce PAPRs. One such approach for selecting PAPR-reduction symbols involves performing iterative combinatorial searches. As an example of a combinatorial approach, suppose a transmitter modulates data using 16-quadrature amplitude modulation (16-QAM) and reserves 8 tones for PAPR-reduction symbols. The transmitter will consider $16^8$ different combinations of PAPR-reduction symbols to place on the reserved tones of each OFDM symbol, and will select the combination of symbols that generates the lowest PAPR.

SUMMARY OF THE INVENTION

In one embodiment, the present invention is a computer-implemented method for reducing peak-to-average power ratio (PAPR) of a transmitter's multi-carrier modulated signal having (i) a plurality of unreserved tones and (ii) zero, one, or more reserved tones reserved a priori for PAPR reduction. The method comprises assigning one or more data symbols to one or more unreserved tones, such that at least one other unreserved tone is a free tone having no data symbol assigned to it. One or more PAPR-reduction symbols are assigned to one or more free tones, and multi-carrier modulation is applied to the one or more data symbols and the one or more free-tone PAPR-reduction symbols based on the tone assignments to generate the multi-carrier modulated signal.

In another embodiment, the present invention is a transmitter for performing the computer implemented method described in the previous paragraph. The transmitter comprises a subcarrier mapper, and an inverse fast Fourier transform (IFFT) processor. The subcarrier mapper is adapted to (a) assign one or more data symbols to one or more unreserved tones, such that at least one other unreserved tone is a free tone having no data symbol assigned to it, and (b) assign one or more PAPR-reduction symbols to one or more free tones. The IFFT processor is adapted to apply multi-carrier modulation to the one or more data symbols and the one or more free-tone PAPR-reduction symbols based on the tone assignments to generate the multi-carrier modulated signal.

In yet another embodiment, the present invention is a computer-implemented method for reducing peak-to-average power ratio (PAPR) of a transmitter's multi-carrier modulated signal. The method comprises determining whether the transmitter has one or more tones available for PAPR reduction. If the transmitter has one or more tones available for PAPR reduction, then at least one PAPR-reduction symbol is assigned to at least one tone available for PAPR reduction, and the multi-carrier modulated signal is generated using the at least one PAPR-reduction symbol.

In yet a further embodiment, the present invention is an apparatus for performing the computer implemented method described in the previous paragraph. The apparatus comprises a controller for a multi-carrier modulator. The multi-carrier modulator has a PAPR-reduction symbol generator and an IFFT processor. The controller is adapted to determine whether the multi-carrier modulator has one or more tones available for PAPR reduction. If the controller determines that the multi-carrier modulator has one or more tones available for PAPR reduction, then the PAPR-reduction symbol generator generates at least one PAPR-reduction symbol for at least one tone available for PAPR reduction, and the IFFT processor generates the multi-carrier modulated signal using the at least one PAPR-reduction symbol.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

In multi-carrier modulation applications, such as orthogonal frequency division multiplexing (OFDM) applications, reserved tones might not always be available for peak-to-average power ratio (PAPR) reduction. For example, in a cellular phone network, the use of reserved tones might not be mandated by standards, and the decision to use these tones could be at the discretion of the equipment vendors. As a result, some base stations or Node B stations in a network that employs multi-carrier modulation might transmit multi-carrier modulated symbols with reserved tones, while others might not.

If a transmitter transmits multi-carrier modulated symbols having a number of unreserved tones that are free (i.e., not assigned data symbols or pilot symbols), then these free tones may be used in a manner similar to that of reserved tones for PAPR reduction. Note that the availability and quantity of free tones may vary over time and may vary from one transmitter to the next. This variation may depend on factors such as the number of users corresponding to a transmitter and the activity of those users. Thus, before PAPR-reduction symbols are assigned to free tones on a particular transmitter, the availability and quantity of such tones are determined. If both free tones and reserved tones are not available on a particular transmitter, then the transmitter may rely on other techniques that reduce the effects of clipping or eliminate clipping altogether. The decision to use reserved tones, free tones, or other techniques may be performed using a controller.

Figure 1:
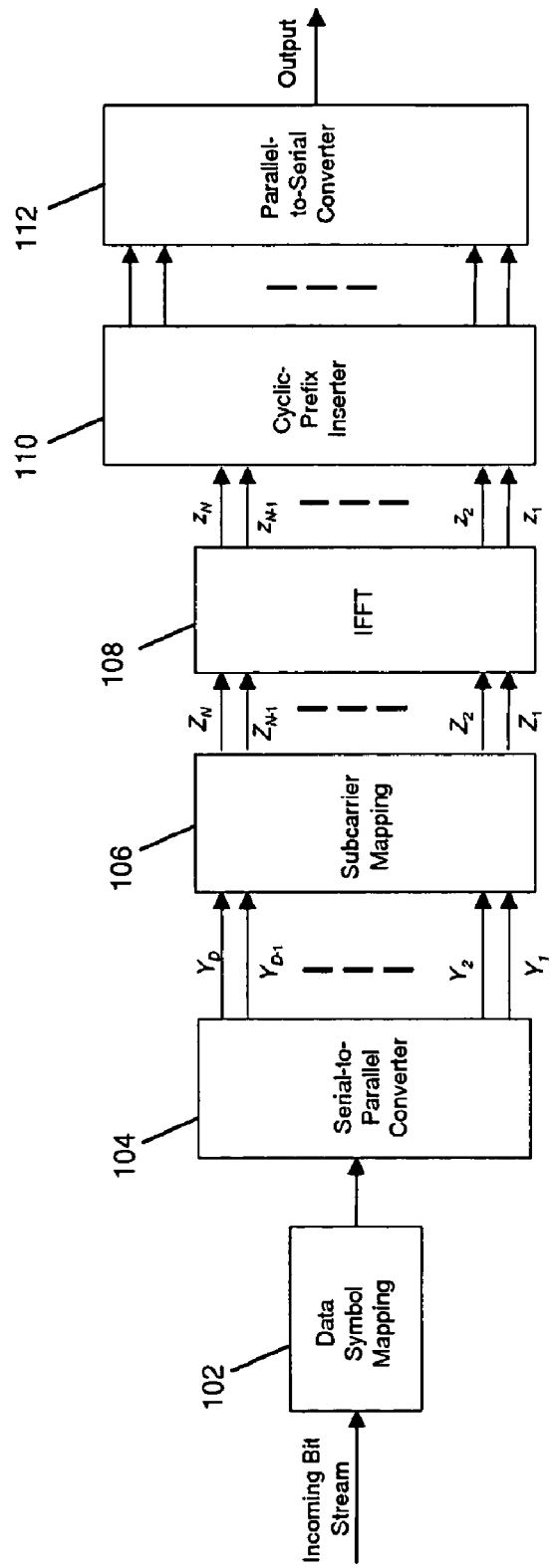
FIG. 1 shows a simplified block diagram of one implementation of a prior-art OFDM transmitter.
Figure 2:
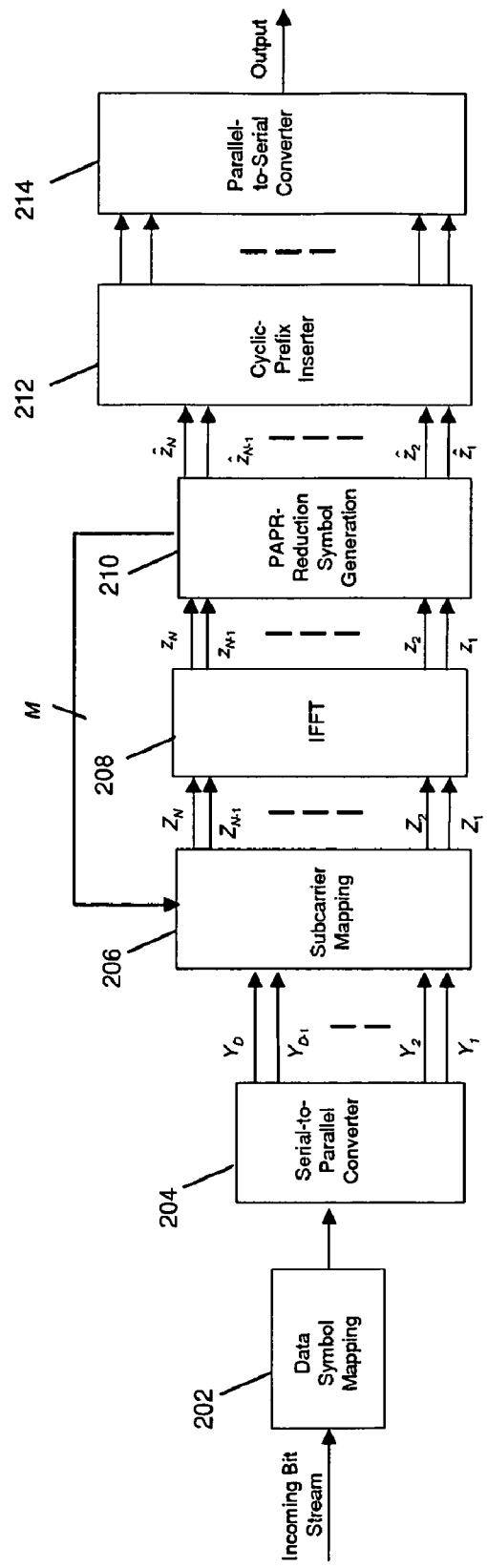
FIG. 2 shows a simplified block diagram of one embodiment of a prior-art OFDM transmitter which uses a tone reservation approach for reducing peak-to-average power ratio (PAPR)
Figure 3:
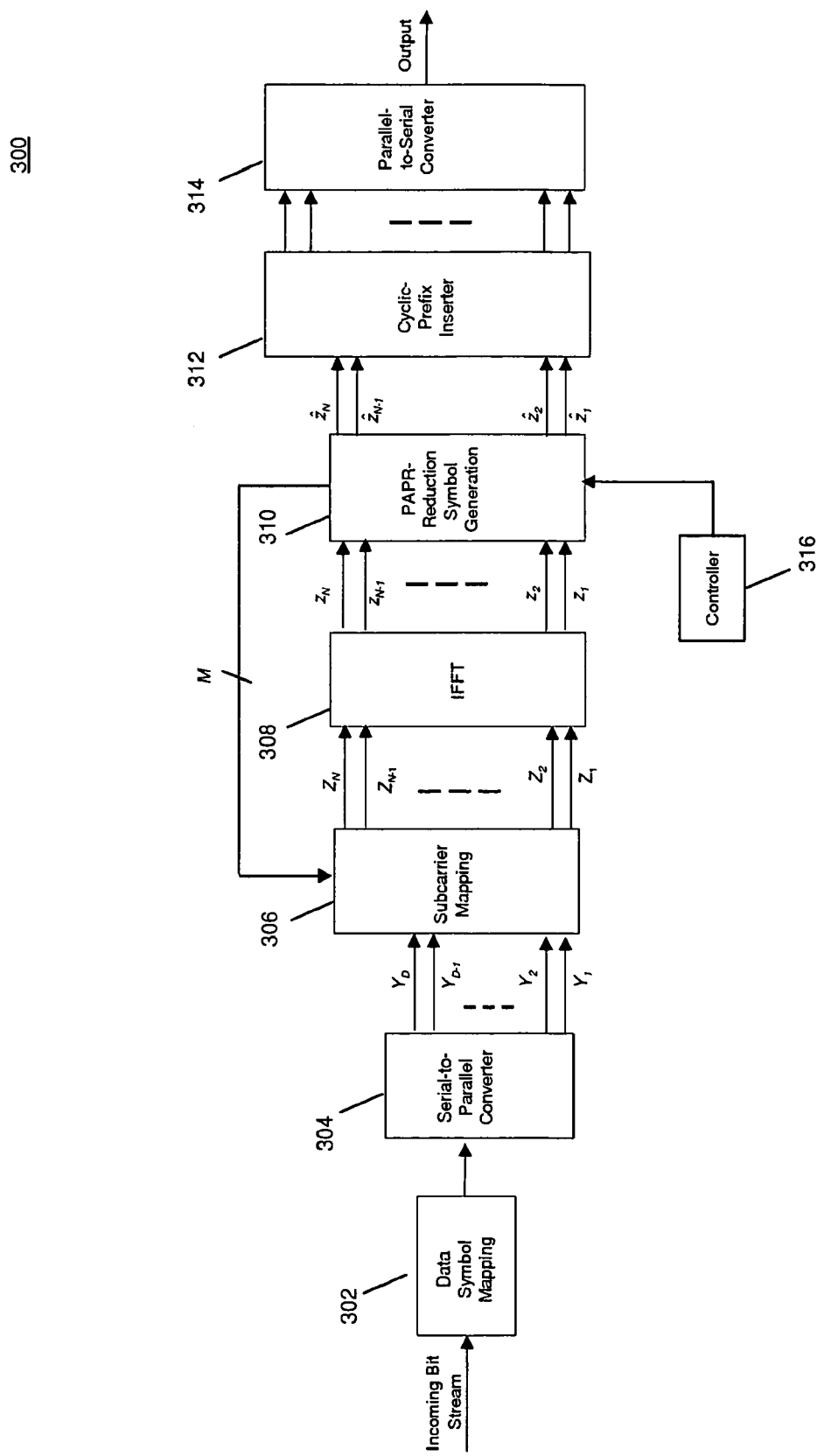
FIG. 3 shows a simplified block diagram of an OFDM transmitter according to one embodiment of the present invention.

FIG. 3 shows a simplified block diagram of an OFDM transmitter 300 according to one embodiment of the present invention. Transmitter 300 has data symbol mapper 302, serial-to-parallel converter 304, subcarrier mapper 306, IFFT processor 308, cyclic prefix inserter 312, and parallel-to-serial (P/S) converter 314, which perform operations analogous to those of the equivalent elements of transmitter 200 of FIG. 2. Similar to transmitter 200, transmitter 300 may have other processing suitable for preparing OFDM symbols for transmission, such as digital-to-analog conversion, radio-frequency modulation, and amplification. Transmitter 300 also has controller 316 for dynamically selecting a method to reduce or eliminate clipping resulting from a high PAPR in an OFDM signal and PAPR-reduction symbol generator 310 for generating PAPR-reduction symbols using the method selected by controller 316.

Figure 4:
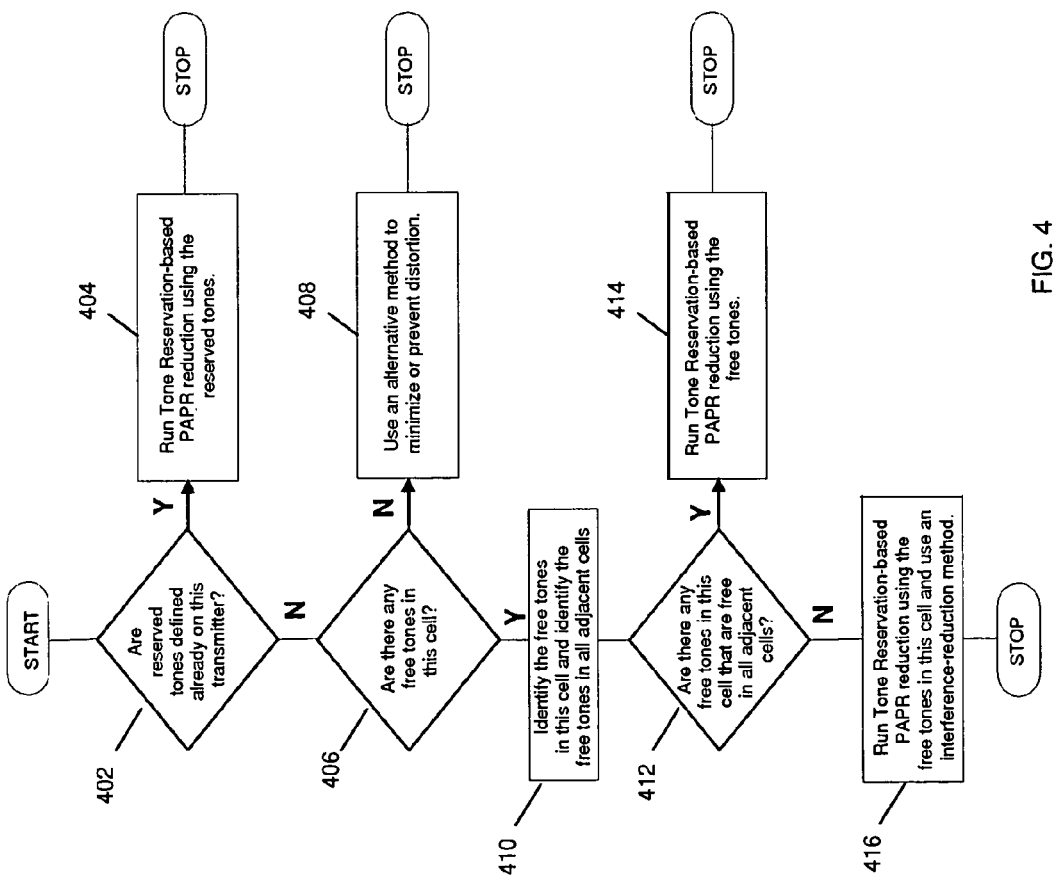
FIG. 4 is a simplified flow diagram of a controller according to one embodiment of the present invention, which may be used to implement the controller of the transmitter of FIG. 3.

FIG. 4 is a simplified flow diagram of a controller 400 according to one embodiment of the present invention, which may be used to implement controller 316 of transmitter 300 of FIG. 3. Upon startup, controller 400 performs decision 402 to determine whether transmitter 300 is adapted to transmit an OFDM symbol structure having reserved tones. If transmitter 300 is so adapted, then transmitter 300 is directed to generate and transmit PAPR-reduction symbols on the reserved tones (operation 404). The PAPR-reduction symbols may be generated using a combinatorial approach or any other suitable technique that generates PAPR-reduction symbols.

If transmitter 300 does not have any reserved tones, then controller 400 performs decision 406, which determines if there are any free tones on transmitter 300 (i.e., in this cell). If there are no free tones on transmitter 300, then transmitter 300 may use alternative methods (i.e., methods that do not rely on PAPR-reduction symbols) to minimize or prevent distortion resulting from clipping by the amplifier (operation 408). Such alternative methods include alternative PAPR-reduction methods, such as scrambling sequence methods, successive clipping and filtering methods, or any other suitable alternative. Typically, a transmitter that does not have reserved tones for PAPR reduction will already be adapted to perform one of these alternative methods. Thus, if no reserved or free tones are available, then controller 400 may default to the preexisting method. Additionally, the use of such methods might result in higher error-vector magnitudes (EVM), and consequently, the receiver may have difficulty decoding the transmitted data. To compensate for higher EVMs, transmitter 300 may employ a modulation method that is less sensitive to decoding errors. For example, transmitter 300 may choose to modulate data in data symbol mapper 302 using quadrature-phase-shift keying (QPSK) as opposed to using quadrature-amplitude modulation (QAM).

If free tones are available on transmitter 300, then the free tones on transmitter 300 are identified (operation 410), the free tones on all adjacent transmitters are identified (operation 410), and controller 400 performs decision 412. Decision 412 determines if there are any free tones on transmitter 300 that are free on all adjacent transmitters (i.e., adjacent cells). To accomplish this, transmitter 300 receives information about tones used by adjacent transmitters from, for example, the adjacent transmitters themselves or from a network controller. According to alternative embodiments, controller 400 may be performed by the network controller itself, and thus this information would not need to be provided to the transmitter. If decision 412 determines that there are tones that are free on both transmitter 300 and all adjacent transmitters, then operation 414 generates and transmits PAPR-reduction symbols on those identified free tones as if they were reserved tones. The PAPR-reduction symbols may be generated using any suitable technique as described in relation to operation 404. Alternatively, operation 414 may generate and transmit PAPR-reduction symbols on the tones that are free on transmitter 300 and all adjacent transmitters along with one or more tones that are free on transmitter 300 but are not free on all adjacent transmitters. For such tones that are not free on all adjacent transmitters, operation 414 may employ suitable interference-reduction methods as described below.

If decision 412 determines that there are no tones that are free on both transmitter 300 and all adjacent transmitters, then transmitter 300 may generate and transmit PAPR-reduction symbols using the tones that are free on transmitter 300 (operation 416) as if they were reserved tones. Similar to operation 404, the PAPR-reduction symbols may be generated using any suitable technique. Note, however, that since these tones are being used by one or more adjacent transmitters to transmit data, interference may occur between transmitter 300 and the one or more adjacent transmitters. To minimize or prevent interference, transmitter 300 may apply tight power limits on the free tones, and transmitter 300 and possibly one or more of the adjacent transmitters may employ frequency hopping or any other suitable interference-reduction method.

Figure 5:
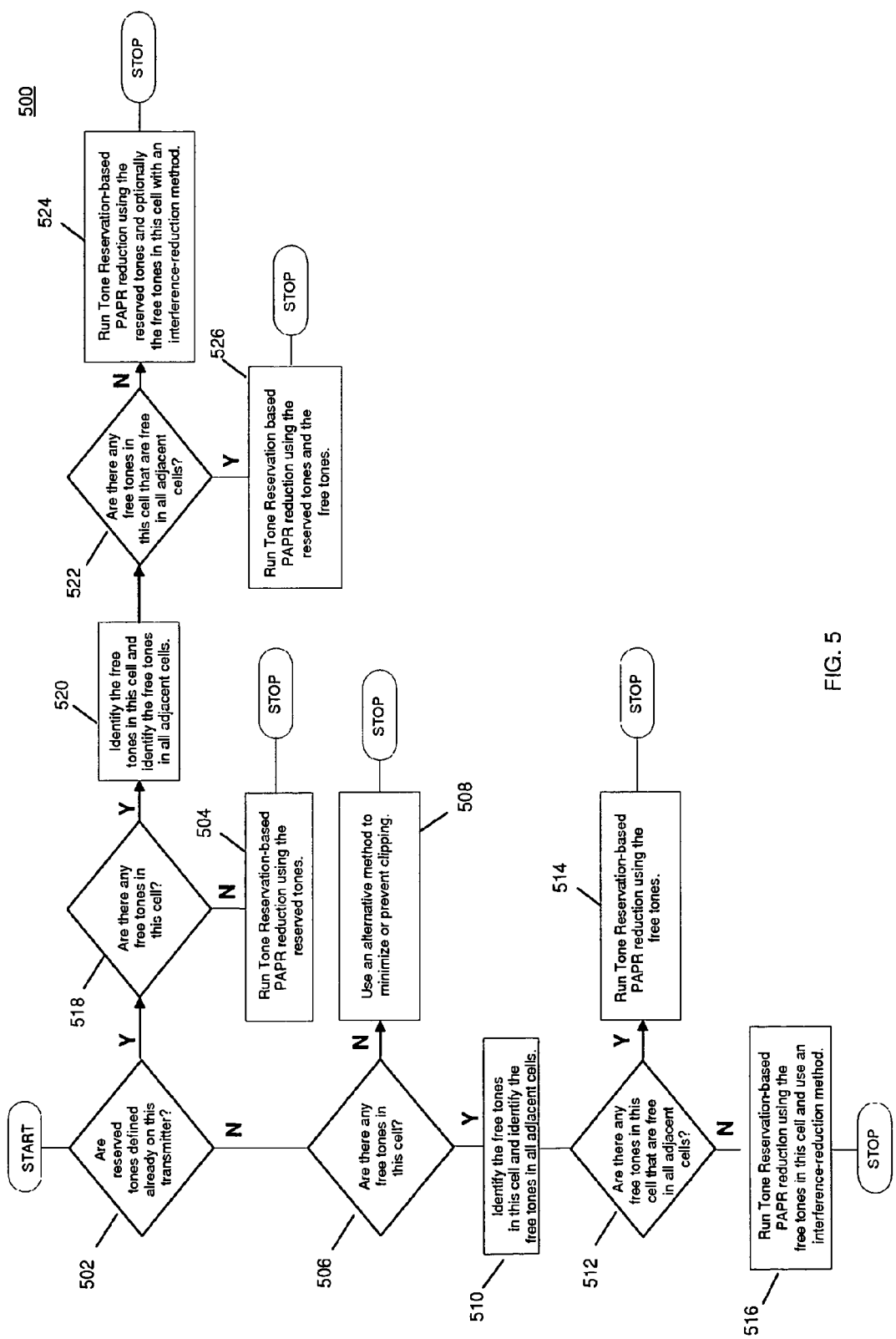
FIG. 5 is a simplified flow diagram of a controller according to another embodiment of the present invention, which may be used to implement the controller of the transmitter of FIG. 3.

FIG. 5 is a simplified flow diagram of a controller 500 according to an alternative embodiment of the present invention, which may be used to implement controller 316 of transmitter 300 of FIG. 3. As shown, controller 500 has blocks 502, 504, 506, 508, 510, 512, 514, and 516, which are analogous to the equivalent blocks of controller 400 of FIG. 4. However, if decision 502 determines that there are reserved tones on transmitter 300, controller 500 does not necessarily generate and transmit PAPR-reduction symbols on the reserved tones as is performed by operation 404 of controller 400. Instead, controller 500 performs decision 518 to determine if there are any free tones on transmitter 300. If there are no free tones on transmitter 300, then transmitter 300 performs operation 504, which is analogous to operation 404.

If decision 518 determines that there are free tones on transmitter 300, then those tones are identified (operation 520), the free tones on all adjacent transmitters are identified (operation 520), and controller 500 performs decision 522. Decision 522 determines if there are any tones that are free on both transmitter 300 and all adjacent transmitters in a manner similar to that of decision 412 of controller 400. If there are no tones that are free on both transmitter 300 and all adjacent transmitters, then decision 524 may generate and transmit PAPR-reduction signals on the reserved tones and zero, one, or more of the free tones on transmitter 300 using any suitable PAPR-reduction technique. In addition, if one or more of the free tones on transmitter 300 are used, interference reduction methods may be run to prevent interference with other transmitters as discussed above in relation to operation 416 of controller 400.

If decision 522 determines that there are tones that are free on both transmitter 300 and all adjacent transmitters, then controller 500 performs operation 526. Operation 526 generates and transmits PAPR-reduction symbols on one or more of the free tones identified and on the reserved tones using any suitable PAPR-reduction technique. Alternatively, operation 526 may generate and transmit PAPR-reduction symbols on one or more of the tones that are free on transmitter 300 and all adjacent transmitters, on one or more of the tones that are free on transmitter 300 but not on all adjacent transmitters, and on the reserved tones. In this case, operation 526 may employ suitable interference-reduction methods as described above to reduce interference with adjacent transmitters.

According to various embodiments of the present invention, a controller for dynamically selecting methods to reduce distortion in multi-carrier modulated signals may include fewer than all of the operations and decisions of controllers 400 and 500. For example, according to one such embodiment, a controller according to the present invention may include only decision 402, operation 404, and operation 408. In this case, if reserved tones are defined on transmitter 300 (decision 402), then transmitter 300 runs any suitable tone reservation-based PAPR-reduction technique using the reserved tones (operation 404). If no reserved tones are defined on transmitter 300, then transmitter 300 uses an alternative method to minimize or prevent distortion as described above (operation 408).

According to further embodiments, the order of the decisions and operations may be interchanged without departing from the scope of this invention.

According to yet further embodiments, higher-order modulation may be used in addition to using reserved and free tones to increase throughput. For example, data symbol mapper 302 of transmitter 300 of FIG. 3 may modulate data using QAM when reserved tones, free tones, or both reserved tones and free tones are available. On the other hand, data symbol mapper 302 may modulate data using QPSK when either reserved tones, free tones, or both are not available. The use of higher-order modulation may depend on the amount of distortion that is reduced as a result of the use of reserved and free tones. If distortion is reduced sufficiently, then the use of higher-order modulation may be more reliable than if reserved tones, free tones, or both were not used.

While the present invention was described relative to its use with OFDM applications, the present invention is not so limited. The present invention may also be extended to other multi-carrier modulation applications such as digital subscriber line (DSL) applications, coded OFDM applications, or any other suitable multi-carrier modulation application.

The present invention may be implemented in controllers for different types of transmitters in a cellular network (e.g., for base stations, node B stations, or mobile devices) or may be implemented elsewhere in the network, such as at a network controller, to control one or more transmitters in the network. In the case of mobile devices, the base station may provide information about the availability of free tones to the mobile devises. Although, the present invention has been described in the context of a cellular network, the present invention is not so limited. The present invention may be used in other wireless networks, including wireless local area networks (WLANs), wireless metropolitan area networks (WMANs), or any other suitable wireless networks.

Additionally, while the present invention was described in terms of its use with wireless networks, the present invention is not so limited. The present invention may also be used in wired networks such as a digital subscriber line (DSL) network, or in any other wired network that employs OFDM.

The term "adjacent" as used in the specification and the claims refers to all transmitters or cells within, for example, a certain range (e.g., distance). The range may be chosen based on the nearby transmitters that might interfere with the current transmitter. As such, the term "adjacent" is not limited to immediately neighboring cells or transmitters.

The present invention may be implemented in a transmitter that was originally designed with both PAPR-reduction symbol generator 310 and controller 316. Alternatively, the present invention may be used to retrofit existing transmitters that might or might not have a PAPR-reduction symbol generator. For an existing transmitter having a PAPR-reduction symbol generator, the transmitter may be retrofitted by adding controller 316. For an existing transmitter not having a PAPR-reduction symbol generator, the transmitter may be retrofitted by adding both controller 316 and PAPR-reduction symbol generator 310.

A number of operations (e.g., 404, 414, 416) were discussed in terms of performing a suitable method to generate PAPR-reduction symbols. It should be noted, however, that a controller according to the present invention is not limited to always performing the same method. Instead, a controller may select a suitable method for generating PAPR-reduction symbols based on factors such as the numbers of currently available reserved tones and free tones. For example, if no reserved tones are available, and only a relatively small number of free tones are available, then the number of different combinations of PAPR-reduction symbols that will achieve an acceptable level of PAPR reduction will be relatively small. Thus, an algorithm capable of finding the best available solution may be used to generate PAPR-reduction symbols with relatively low computational load. On the other hand, if relatively large numbers of reserved tones and/or free tones are available, then there will likely be a larger number of different combinations of PAPR-reduction symbols that will achieve an acceptable level of PAPR reduction. In this case, an algorithm that does not necessarily find the best available solution may be used to generate the PAPR-reduction symbols in order to keep the computational load at an acceptable level.

Additionally, according to certain embodiments of the present invention, the gradient-descent approaches taught in U.S. patent application no. 12/377,178 filed on the same date at this patent application as may be used to generate PAPR-reduction signals for free tones, reserved tones, or both free and reserved tones.

As used in the claims, the term "reserved tones" refers to tones reserved a priori for PAPR reduction. All other tones, including pilot tones, are unreserved.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes all apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

I claim:

1. A computer-implemented method for reducing peak-to-average power ratio (PAPR) of a transmitter's multi-carrier modulated signal having (i) a plurality of unreserved tones and (ii) one or more reserved tones reserved a priori for PAPR reduction, the method comprising:
   (a) assigning one or more data symbols to one or more unreserved tones, such that at least one other unreserved tone is a free tone having no data symbol assigned to it;
   (b) assigning one or more PAPR-reduction symbols to one or more free tones, and assigning one or more PAPR-reduction symbols to the one or more reserved tones; and
   (c) applying multi-carrier modulation to the one or more data symbols, the one or more free-tone PAPR-reduction symbols, and the one or more reserved-tone PAPR-reduction symbols based on the tone assignments to generate the multi-carrier modulated signal, wherein:
   one or more of steps (a), (b), and (c) is implemented by the computer.

2. The invention of claim 1, wherein the multi-carrier modulated signal is an orthogonal frequency division multiplexed (OFDM) signal and the multi-carrier modulation is OFDM modulation.

3. A computer-implemented method for reducing peak-to-average power ratio (PAPR) of a transmitter's multi-carrier modulated signal having (i) a plurality of unreserved tones and (ii) zero, one, or more reserved tones reserved a priori for PAPR reduction, the method comprising:
   (a) assigning one or more data symbols to one or more unreserved tones, such that at least one other unreserved tone is a free tone having no data symbol assigned to it;
   (b) assigning one or more PAPR-reduction symbols to one or more free tones;
   (c) applying multi-carrier modulation to the one or more data symbols and the one or more free-tone PAPR-reduction symbols based on the tone assignments to generate the multi-carrier modulated signal;
   (d) determining whether a tone having a free-tone PAPR-reduction symbol is used by an adjacent transmitter; and (e) causing an interference-reduction method to be implemented if the tone is determined to be used by an adjacent transmitter, wherein:
one or more of steps (a), (b), and (c) is implemented by the computer.

4. A computer-implemented method for reducing peak-to-average power ratio (PAPR) of a transmitter's multi-carrier modulated signal having (i) a plurality of unreserved tones and (ii) zero, one, or more reserved tones reserved a priori for PAPR reduction, the method comprising:
(a) assigning one or more data symbols to one or more unreserved tones, such that at least one other unreserved tone is a free tone having no data symbol assigned to it;
(b) assigning one or more PAPR-reduction symbols to one or more free tones;
(c) applying multi-carrier modulation to the one or more data symbols and the one or more free-tone PAPR-reduction symbols based on the tone assignments to generate the multi-carrier modulated signal, wherein:
one or more of steps (a), (b), and (c) is implemented by the computer;
for a first multi-carrier modulated symbol in the multi-carrier modulated signal, at least one tone is assigned a free-tone PAPR-reduction symbol; and
for a second multi-carrier modulated symbol in the multi-carrier modulated signal, the at least one tone is assigned a data symbol.

5. A computer-implemented method for reducing peak-to-average power ratio (PAPR) of a transmitter's multi-carrier modulated signal having (i) a plurality of unreserved tones and (ii) zero, one, or more reserved tones reserved a priori for PAPR reduction, the method comprising:
(a) assigning one or more data symbols to one or more unreserved tones, such that at least one other unreserved tone is a free tone having no data symbol assigned to it;
(b) assigning one or more PAPR-reduction symbols to one or more free tones;
(c) applying multi-carrier modulation to the one or more data symbols and the one or more free-tone PAPR-reduction symbols based on the tone assignments to generate the multi-carrier modulated signal, wherein:
one or more of steps (a), (b), and (c) is implemented by the computer; and
the one or more data symbols are generated using a higher-order of modulation than is used to generate the one or more data symbols data symbols when no PAPR-reduction symbols are applied to the free tones, the reserved tones, or both the free tones and the reserved tones.

6. A transmitter for reducing peak-to-average power ratio (PAPR) of a multi-carrier modulated signal having (i) a plurality of unreserved tones and (ii) one or more reserved tones reserved a priori for PAPR reduction, the transmitter comprising:
a subcarrier mapper adapted to (a) assign one or more data symbols to one or more unreserved tones, such that at least one other unreserved tone is a free tone having no data symbol assigned to it, (b) assign one or more PAPR-reduction symbols to one or more free tones, and (c) assign one or more PAPR-reduction symbols to the one or more reserved tones; and
an inverse fast Fourier transform (IFFT) processor adapted to apply multi-carrier modulation to the one or more data symbols, the one or more free-tone PAPR-reduction symbols, and the one or more reserved-tone PAPR-reduction symbols based on the tone assignments to generate the multi-carrier modulated signal.

7. The invention of claim 6, wherein the multi-carrier modulated signal is an orthogonal frequency division multiplexed (OFDM) signal and the multi-carrier modulation is OFDM modulation.

8. The invention of claim 6, further comprising a PAPR-reduction symbol generator adapted to generate the one or more PAPR-reduction symbols for the one or more free tones.

9. A transmitter for reducing peak-to-average power ratio (PAPR) of a multi-carrier modulated signal having (i) a plurality of unreserved tones and (ii) zero, one, or more reserved tones reserved a priori for PAPR reduction, the transmitter comprising:
a subcarrier mapper adapted to (a) assign one or more data symbols to one or more unreserved tones, such that at least one other unreserved tone is a free tone having no data symbol assigned to it, and (b) assign one or more PAPR-reduction symbols to one or more free tones;
an inverse fast Fourier transform (IFFT) processor adapted to apply multi-carrier modulation to the one or more data symbols and the one or more free-tone PAPR-reduction symbols based on the tone assignments to generate the multi-carrier modulated signal; and
a controller adapted to:
determine whether a tone having a free-tone PAPR-reduction symbol is used by an adjacent transmitter; and
cause an interference-reduction method to be implemented if the tone is determined to be used by an adjacent transmitter.

10. A transmitter for reducing peak-to-average power ratio (PAPR) of a multi-carrier modulated signal having (i) a plurality of unreserved tones and (ii) zero, one, or more reserved tones reserved a priori for PAPR reduction, the transmitter comprising:
a subcarrier mapper adapted to (a) assign one or more data symbols to one or more unreserved tones, such that at least one other unreserved tone is a free tone having no data symbol assigned to it, and (b) assign one or more PAPR-reduction symbols to one or more free tones; and
an inverse fast Fourier transform (IFFT) processor adapted to apply multi-carrier modulation to the one or more data symbols and the one or more free-tone PAPR-reduction symbols based on the tone assignments to generate the multi-carrier modulated signal, wherein:
for a first multi-carrier modulated symbol in the multi-carrier modulated signal, the subcarrier mapper assigns a free-tone PAPR-reduction symbol to at least one tone; and
for a second multi-carrier modulated symbol in the multi-carrier modulated signal, the subcarrier mapper assigns a data symbol to the at least one tone.

11. A computer-implemented method for reducing peak-to-average power ratio (PAPR) of a transmitter's multi-carrier modulated signal, the method comprising:
(a) determining whether the transmitter has one or more tones available for PAPR reduction, wherein step (a) determines whether at least one tone available for PAPR reduction is an unreserved tone having no data symbol assigned to it; and
(b) if step (a) determines that the transmitter has one or more tones available for PAPR reduction, then:
(b1) assigning at least one PAPR-reduction symbol to at least one tone available for PAPR reduction; and
(b2) generating the multi-carrier modulated signal using the at least one PAPR-reduction symbol, wherein at one or more of steps (a), (b1), and (b2) is implemented by the computer.

12. The invention of claim 11, wherein the multi-carrier modulated signal is an orthogonal frequency division multiplexed (OFDM) signal.

13. The invention of claim 11, wherein step (a) determines whether at least one tone available for PAPR reduction is reserved a priori for PAPR reduction.

14. The invention of claim 11, wherein:
if step (a) determines that at least one tone available for PAPR reduction is an unreserved tone having no data symbol assigned to it, then step (b) further comprises determining if the at least one unreserved tone is used by an adjacent transmitter; and
if step (b) determines that the at least one unreserved tone is used by an adjacent transmitter, then step (b) further comprises applying an interference-reduction method for the multi-carrier modulated signal.

15. A computer-implemented method for reducing peak-to-average power ratio PAPR of a transmitter's multi-carrier modulated signal, the method comprising:
(a) determining whether the transmitter has one or more tones available for PAPR reduction; and
(b) if step (a) determines that the transmitter has one or more tones available for PAPR reduction, then:
(b1) assigning at least one PAPR-reduction symbol to at least one tone available for PAPR reduction; and
(b2) generating the multi-carrier modulated signal using the at least one PAPR-reduction symbol, wherein:
one or more of steps (a), (b1), and (b2) is implemented by the computer;
step (a) comprises determining whether the transmitter has one or more reserved tones reserved a priori for PAPR reduction; and
if step (a) determines that the transmitter has one or more reserved tones, then:
step (b1) further comprises generating at least one other PAPR-reduction symbol for at least one reserved tone; and
step (b2) comprises generating the multi-carrier modulated signal using the at least one PAPR-reduction symbol and the at least one other PAPR-reduction symbol.

16. The invention of claim 15, wherein if step (a) determines that the multi-carrier modulation has no free tones and no reserved tones, then the multi-carrier modulated signal is generated using a technique that reduces distortion of the multi-carrier modulated signal by a downstream amplifier, wherein the technique does not use any free or reserved tones.

17. An apparatus comprising a controller for a multi-carrier modulator having a PAPR-reduction symbol generator and an inverse fast Fourier transform (IFFT) processor, wherein the controller is adapted to:
(a) determine whether the multi-carrier modulator has one or more tones available for PAPR reduction, wherein the controller determines whether at least one tone available for PAPR reduction is an unreserved tone having no data symbol assigned to it; and
(b) if the controller determines that the multi-carrier modulator has one or more tones available for PAPR reduction, then:
(b1) the PAPR-reduction symbol generator generates at least one PAPR-reduction symbol for at least one tone available for PAPR reduction; and
(b2) the IFFT processor generates the multi-carrier modulated signal using the at least one PAPR-reduction symbol.

18. The invention of claim 17, wherein the multi-carrier modulator is an orthogonal frequency division multiplexing (OFDM) modulator and the multi-carrier modulated signal is an OFDM signal.

19. The invention of claim 17, wherein the apparatus further comprises the multi-carrier modulator.

20. The invention of claim 17, wherein the controller determines whether at least one tone available for PAPR reduction is reserved a priori for PAPR reduction.

21. An apparatus comprising a controller for a multi-carrier modulator having a PAPR-reduction symbol generator and an inverse fast Fourier transform (IFFT) processor, wherein the controller is adapted to:
(a) determine whether the multi-carrier modulator has one or more tones available for PAPR reduction; and
(b) if the controller determines that the multi-carrier modulator has one or more tones available for PAPR reduction, then:
(b1) the PAPR-reduction symbol generator generates at least one PAPR-reduction symbol for at least one tone available for PAPR reduction; and
(b2) the IFFT processor generates the multi-carrier modulated signal using the at least one PAPR-reduction symbol, wherein:
the controller is further adapted to determine whether the multi-carrier modulator has one or more reserved tones reserved a priori for PAPR reduction; and
if the controller determines that the multi-carrier modulator has one or more reserved tones, then:
the PAPR-reduction symbol generator further generates at least one other PAPR-reduction symbol for at least one reserved tone; and
the IFFT processor generates the multi-carrier modulated signal using the at least one PAPR-reduction symbol and the at least one other PAPR-reduction symbol.

* * * * *

UNITED STATES PATENT AND TRADEMARK OFFICE
CERTIFICATE OF CORRECTION

PATENT NO. : 8,351,520 B2  
APPLICATION NO. : 12/377192  
DATED : January 8, 2013  
INVENTOR(S) : Woodward Page 1 of 1

It is certified that error appears in the above-identified patent and that said Letters Patent is hereby corrected as shown below:

On the title page, item [56], please replace "Examiner's Office Letter; Mailed Jul. 7, 2012 for the corresponding JP Application No. 2009-529361" with -- Examiner's Office Letter; Mailed Jul. 23, 2012 for the corresponding JP Application No. 2009-529361 --

Signed and Sealed this
First Day of October, 2013

Teresa Stanek Rea
*Deputy Director of the United States Patent and Trademark Office*